Patented Jan. 22, 1924.

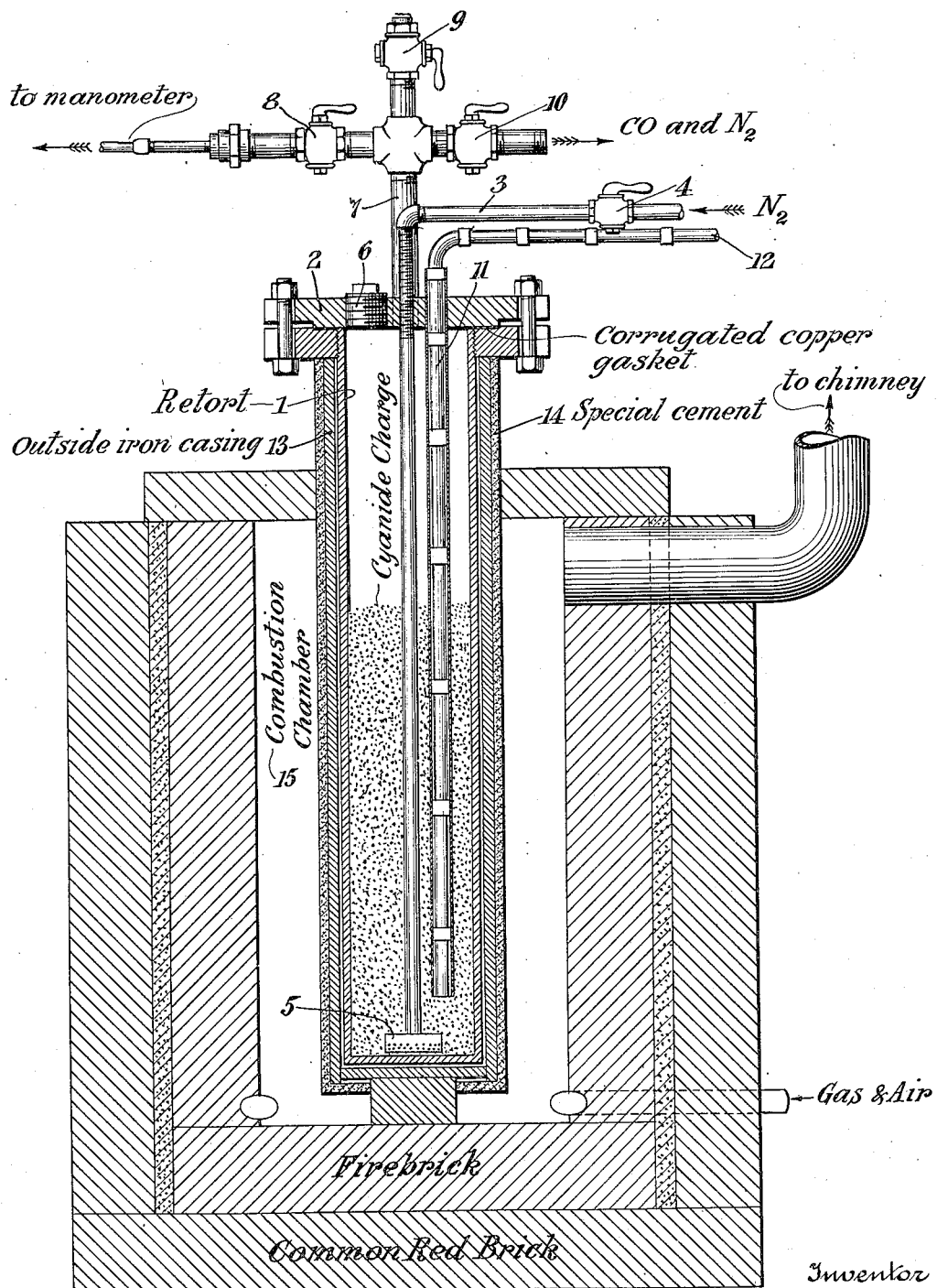

1,481,374

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS FOR THE PRODUCTION OF ALKALI-METAL CYANIDES.

Application filed February 28, 1919, Serial No. 279,802. Renewed June 15, 1923.

*To all whom it may concern:*

Be it known that I, CHARLES B. JACOBS, a citizen of the United States, residing at Wilmington, in the county of New Castle and State of Delaware, have invented new and useful Improvements in Processes for the Production of Alkali-Metal Cyanides, of which the following is a specification.

This invention relates to a process of producing alkali-metal cyanides and pertains especially to a process in which free or elemental nitrogen in a pure state, or free or elemental nitrogen in nitrogen-bearing gases, is caused to combine directly, in the presence of both a reducible compound of a carbide-forming metal and an alkali-metal halide, with carbon and alkali-metal compounds other than halides to form alkali-metal cyanides.

In a study of the fixation of nitrogen as alkali-metal cyanides made with the object of reducing the temperature necessary to form alkali-metal cyanides or of materially increasing the yield of cyanides, when alkali-metal compounds, carbon and nitrogen are heated together, I made the discovery that the addition of alkali-metal halides to sodium carbonate and coke, charcoal or like forms of carbon, caused the formation of sodium cyanide at temperatures below those at which cyanide is formed, when alkali compounds and carbon are heated alone in nitrogen.

I found, for example: That when a mixture, composed of 42% of sodium carbonate, 50% of foundry coke and 8% of sodium chloride, was heated for two hours and a half in nitrogen, at atmospheric pressure, to 730° C., the resulting product contained 6% of sodium cyanide and 0.6% of sodium cyanamide.

When the same mixture was heated in nitrogen under a pressure of 15 lbs. per sq. in. at 800 to 850° C. for four hours, and for six hours, the products contained 16.5% and 20.3% of sodium cyanide, respectively, and no cyanamide.

It was further found that when a mixture of substantially equal parts by weight of sodium carbonate and carbon, containing from 17 to 21% by weight of sodium chloride, was heated for from 5 to 6 hours at from 850 to 960° C. in nitrogen under a pressure of about 15 lbs. per sq. in. from 50 to 71% of the sodium carbonate of the charge was converted into sodium cyanide.

I also made the discovery that the addition of alkali-metal halides, together with reducible compounds of carbide- or nitride-forming metals such as oxides of iron, or finely divided iron, to a mixture of sodium carbonate and coke, charcoal and the like, caused a material increase in the formation of sodium cyanide in a shorter time when the mixture was heated in free nitrogen, either pure or mixed with other gases, than when the alkali-metal halides alone, or iron oxide or iron alone, were used. Thus when oxide of iron and alkali-metal halide were added to charges of sodium carbonate and carbon containing 40 to 50% of sodium carbonate, 70 to 85% of the sodium carbonate was converted into sodium cyanide in from three to four hours when the charges were heated from 850–950° C. in nitrogen or producer gas under an absolute pressure of about 30 lbs. per sq. in. This yield of sodium cyanide is far greater than can be obtained when an alkali-metal halide is not used.

The proportions of the reagents used may be varied widely without decreasing the yield of cyanide below the point at which it has practical value. The alkali-metal compound other than halide, and the carbon are preferably employed in about equal amounts. With 40 parts of sodium carbonate and about 35 to 45 parts of carbon, for example, I may use as little as 3 parts of sodium fluoride and 9 parts iron oxide; I consider it preferable, however, with the above mentioned parts of the carbonate and carbon to use greater amounts of halide and iron oxide, such as from 5 to 12 parts of sodium fluoride and from 35 to 15 parts of iron oxide.

Other metallic oxides and metals, such as manganese, chromium, nickel, and cobalt, have the same general effect when mixed with alkali-metal halides but not to as great an extent as iron oxide or metallic iron.

The process to which the present application is directed may therefore be stated concisely to comprise heating in contact with nitrogen or a nitrogen-bearing gas a mixture containing an alkali-metal halide such as sodium chloride or fluoride, a reducible compound of a carbide- or nitride-forming metal which may preferably be a finely divided substance comprising iron such as iron or iron oxide, a compound of an alkali-metal other than a halide, and carbon, to a temperature, preferably from 850 to 970° C., sufficient to effect a reaction between the carbon, nitrogen and the alkali-metal compound to form an alkali-metal cyanide. In its preferred form the process is carried out by heating the mixture containing the reducible compound of a carbide-forming metal, to a sufficient temperature to expel gaseous reduction products from the reducible compound to render the mixture porous, and, while continuing the heating, passing nitrogen through said mixture at a temperature sufficient to effect a reaction between the carbon, nitrogen and the alkali-metal compound to form an alkali-metal cyanide.

The discovery of the effect and use of alkali-metal halides in the formation of cyanides from alkali-metal compounds, carbon, and free or elemental nitrogen is fully disclosed in my companion application for Letters Patent, Serial No. 279801 filed coincidently with this application in the U. S. Patent Office.

In said application Serial No. 279801, the previous art is referred to and I will not recite it in this application, which deals with the combined effect of alkali-metal halides and certain metallic compounds and metals in the synthesis of alkali-metal cyanides from alkali-metal compounds, carbon and free nitrogen, except in so far as it may be necessary, in certain instances, in order to make clear the distinction or relationship between the present process and what may have been done heretofore.

The formation of sodium cyanide from sodium carbonate, carbon, and nitrogen is expressed by the following empirical equation:

(1) 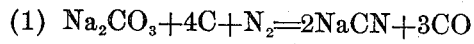
$$Na_2CO_3 + 4C + N_2 = 2NaCN + 3CO$$

from which it will be seen that the evolution of CO from the reacting mass is an indication of the progress of the cyanide formation. In operating with mixtures of sodium carbonate, coke, and sodium chloride, in which from 40 to 50% of the charge was composed of sodium carbonate, it was found that after 50 to 71% of the sodium carbonate present in the charge had been converted into sodium cyanide, which usually required about 5 or 6 hours at temperatures between 850 and 900° C., that heating the same charge for from 10 to 14 hours under the same conditions only raised the yield of cyanide about 4% over that obtained at the end of 5 or 6 hours.

This falling off of the cyanide reaction, referred to above in equation (1), was also indicated by the sudden drop in the carbon monoxide in gas samples taken from the outlet of the retorts after the fourth and fifth hours during the operation.

Observations made on charges of the above compositions at various stages of the operation, both before and after nitrogen had been admitted to the charge, led to the conclusion that, after about 50% of the sodium carbonate had been converted into sodium cyanide, the charge assumed a viscous or pasty condition, causing the nitrogen to form blow holes and channels through the mass, thus preventing uniform distribution of the nitrogen and destroying the proper physical contacts between the nitrogen and the other reactive elements of the charge.

It was thought that this change in the physical state of the reaction mass was the principal cause of the slowing down of the reaction and that if the charge could be made to retain, to a large extent, its original porosity and physical state, the velocity of the reaction would keep up and go more nearly to completion in a shorter time.

For this purpose, the addition of such compounds to the charge were sought as seemed most likely to bring about the desired physical condition, and, at the same time, be of themselves an aid in the cyanide reaction.

Oxide of iron is quite infusible at the temperature of the cyanide reaction and its reduction, either partially or completely, which takes place readily at that temperature, by the carbon of the charge, gave promise of creating a degree of porosity by the liberation and expulsion of CO, favorable to the objects in view.

The catalytic action which the iron has been repeatedly stated to possess would be another favorable factor. This use of metallic iron in the formation of alkali cyanides was shown by Lewis Thompson in 1839 (Mechanics Magazine, May 11, 1839).

The literature on the subject offers well authenticated evidence that finely divided iron functions in the cyanide reaction both as a carrier of carbon and of nitrogen.

The mechanism of the action of iron and similar metals in the cyanide reaction, by their power of taking up or dissolving carbon and transferring it to the other reactive elements of the charge, was fully disclosed and explained by Victor Adler in his German Patents Nos. 12,351 of 1880, and 18,945 of 1881.

The action of finely divided iron as a carrier of nitrogen in the cyanide reaction by its power of taking up free or elemental nitrogen as iron nitride and subsequently giving up its nitrogen to the other reactive elements to form alkali cyanides was pointed out and demonstrated by Ernst Täuber in 1899 (Berichte der Deutschen Chemischer Gesellschaft 32 3150, 1899). See also Fowler in Journal of Chemical Society, London, 1901, page 297.

The combined functions of the alkali-metal halides and iron or iron compounds in the formation of alkali-metal cyanides are best explained by first considering the action of the alkali-metal halides, which is discussed in some detail in the copending application Serial No. 279801, filed coincidently with this.

The exact function of the sodium halides in promoting the formation of alkali-metal cyanides at lower temperature than they are usually formed is not well understood.

In the absence of any tangible evidence of chemical action, the view is held that the function of the halide compound in the reaction is a physical one, and has to do with the whole complex melting point diagram of the system.

Besides acting as a flux and dissolving away protecting coatings of already formed cyanides, liquefaction of the mass allows nitrogen to dissolve and increases the velocity of its action. These combined physical functions of the halide compound also bring about a more intimate physical contact between the reactive elements of the charge and offer an explanation of the lower temperature required for the cyanide formation.

The following equation (1) expresses empirically the generally accepted reaction, by which sodium cyanide is formed from sodium carbonate, carbon and nitrogen:

(1) $Na_2CO_3 + 4C + N_2 = 2NaCN + 3CO$.

The chemistry of the reaction is more complicated than is indicated by the above equation. We known, for example, that in carrying out the above reaction in the ordinary manner by heating sodium carbonate and carbon in nitrogen at from 950–1000° C., if the nitrogen supply is insufficient, or cut off entirely, metallic sodium and also sodium carbide are formed as well as sodium cyanide.

In the presence of a flux such as sodium chloride or sodium fluoride, or mixtures of the same, it is quite possible that the above reaction takes place through a succession of progressive steps and that the nitrogen is first combined transitorily in an intermediate compound formed at lower temperature, which quickly becomes transformed into the cyanide.

The presence of sodium cyanamide found in the product of the experiment carried out at 730° C., given above, favors this view. We know from Drechsel's reaction (Jr. pr. Chem. 1880, 2, 77) that in the presence of carbon alkali-metal cyanamides take up carbon and pass into cyanides at temperatures below 800° C. For this reason it was only in this experiment, carried out at 730°, that any trace of cyanamide was found in the product. In experiments 2 and 3, conducted at temperatures above 800°, only sodium cyanide was found in the product.

Cyanamides in general are known to form at lower temperatures than the corresponding cyanide, and the formation of sodium cyanide at lower temperature through the physical agency of sodium chloride or fluoride may possibly be explained by chemical reactions taking place in a manner similar to the following:

(2) $Na_2CO_3 + C \rightleftharpoons Na_2O + 2CO$
(3) $Na_2O + 3C \rightleftharpoons Na_2C_2 + CO$
(4) $Na_2C_2 \rightleftharpoons Na_2C + C$
(5) $Na_2C + N_2 \rightleftharpoons Na_2CN_2$
(6) $Na_2CN_2 + C \rightleftharpoons Na_2C_2N_2$ or $2NaCN$ Combining all of these into one equation, we have the empirical equation:

(1) $Na_2CO_3 + 4C + N_2 = 2NaCN + 3CO$ given above.

The sodium chloride or fluoride, by their fluxing action, allow the above reactions to come to equilibrium more speedily since they effect closer physical contact of the reacting materials. Thus, these reactions proceed to the right until true equilibrium is more nearly attained. In support of this view of the mechanism of sodium cyanide formation, the following facts, which are well established experimentally, may be cited:

1. Sodium oxide is always found in the finished product.

2. Sodium is reduced from sodium oxide at lower temperatures than from sodium carbonate—Gmelin-Kraut 2, 1; 285.

3. Sodium carbide is formed when sodium is acted upon by carbon or carbon monoxide. In the production of metallic sodium from sodium carbonate and carbon, the formation of sodium carbide was one of the difficulties which defeated efforts to operate the process by causing low yields of sodium; see also Mactear, Jour. Soc. Chem. Ind., 1887, page 174; Richards "Aluminum," page 198.

4. Calcium carbide breaks down into a sub-carbide CaC when heated with calcium fluoride. The sub-carbide absorbs nitrogen readily and forms calicum cyanamide, see Allmand, Applied electro-chemistry, 481; Arnold 1912; and Knox, Fixation of atmospheric nitrogen, 91, 92. By analogy, sodium carbide may follow the same course.

It is of course possible that the reaction only proceeds as far as the formation of sodium carbide, which being an unsaturated compound, takes up nitrogen directly to form cyanide:

$Na_2C_2 + N_2 = 2NaCN$ or it may follow the same course as calcium carbide shown by Allmand:

$$Na_2C_2 + N \rightleftharpoons Na_2CN_2 + C$$

which, on further heating, with carbon, according to Drechsel, passes into cyanide:

$$Na_2CN_2 + C = 2NaCN.$$

With the nitrogen dissolved in the reaction mass and with the known property of iron and certain other metals to dissolve and transfer carbon and nitrogen by the formation of carbides, we have two of the necessary components of alkali-metal cyanides in solution at the same time in the reaction mass, a condition which would obviously increase the velocity of the reactions and allow them to proceed more rapidly to the right until true equilibrium is more nearly established.

Drechsel, in his "Contributions to the knowledge of cyanamides, Part III" (Jr. pr. Chem. 1880, 2, 21–77, has shown that carbides of iron are extremely active in supplying carbon to alkali-metal cyanamides, causing them to pass into alkali-metal cyanides.

The nitrogen required for the production of cyanides by this process, as stated above, may be free or elemental nitrogen in a pure state, or it may be mixed with other gases, as, for example, with carbon monoxide, as in producer gas.

In operating with producer gas as the source of nitrogen, certain precautions are necessary: Carbon dioxide destroys cyanide rapidly even at high temperature and the producer gas used must contain the minimum quantity of $CO_2$ in order to obtain practical results. The cyanide charge cannot be allowed to cool in contact with producer gas, since the equilibrium expressed by the equation $$2CO \rightleftharpoons C + CO_2$$

gives almost pure CO above 900° C. while at 500 to 600° C. the gaseous product is almost all $CO_2$. By observing the proper precautions, the same results are obtained with producer gas as with free nitrogen.

The nitrogen may be passed into or through the charge under ordinary atmospheric pressure but I prefer to use a pressure of about 15 lbs. per sq. in. as it insures a higher concentration of the nitrogen in the charge and a more intimate contact. The function of the pressure is purely physical.

Although, as indicated above, the conditions under which the new process can be carried out may be widely varied, one preferred embodiment of my process is exemplified in the following description taken in connection with the accompanying drawing which shows a view in vertical section through the center of an apparatus which I have found to be suitable for carrying out the process.

The apparatus consists of an iron retort 1 capable of standing a pressure of at least 15 lbs. per sq. in. at temperatures of from 900 to 1100° C. This retort has a flanged head 2 provided with an inlet pipe 3 having a valve 4 for introducing the nitrogen, the pipe 3 ending in a distributor 5 near the bottom of the retort. A charging hole in the head 2 for introducing the charge is closed with a plug 6 and an outlet 7 is also provided in the head 2 for the escape of the gases given off in the reaction, together with the excess of nitrogen or producer gas used in the operation. The pipe 7 ends in a cross carrying the valves 8, 9 and 10 as shown. The pipe having valve 8 leads to a manometer (not shown). The valve 9 is for taking gas samples during the operation. The retort is also fitted with a pyrometer pocket 11 and a thermocouple 12 for indicating the temperature of the charge during the operation. The retort proper is set inside of an outside iron casing 13, covered with a fireclay composition 14 to protect it from oxidation by the gases of the combustion chamber 15. The combustion chamber 15, in which the retort 1 and casing 13 are placed, is similar to the ordinary steel-soaking pit furnace in which steel ingots are heated before being rolled.

In carrying out the operation of manufacturing sodium cyanide the retort 1 is first closed tight and the charge, which, for example, consists of 40% of sodium carbonate, 40% of coke, charcoal, or like forms of carbon, 15% of oxide of iron and 5% of sodium fluoride, is introduced through the charging hole until the retort is filled about two thirds full. The retort is then placed inside the protective iron casing within the furnace, and the connections made to the manometer and to the source of nitrogen supply, as indicated in the drawing. The valve 10 is opened to allow the escape of any volatile matter in the charge. When the operating temperature of about 925–950° C. has been reached, as indicated by the pyrometer reading, nitrogen is turned into the retort through the valve 4. The valve 8 is now opened to the manometer and the outlet or bleeder valve 10 adjusted, so that the desired pressure is obtained inside the retort.

With the iron retort above described at a temperature of about 950° C., a pressure of about 20 pounds per square inch above atmospheric pressure may be used without causing injurious distortion of the retort. In general, I have found it desirable to use as high a pressure as the retort will withstand without injury, it being understood that the temperature is a more important factor than the pressure. The beneficial effect of increased pressure is quite noticeable when it reaches a value of as little as 8 pounds above atmospheric pressure (i. e., 23 pounds per square inch absolute pressure).

Gas samples are taken from time to time through the valve 9. The operation is continued for a pre-determined time or until the gas samples show little or no CO. This indicates that the reaction is over. In case producer gas is the source of nitrogen the gas samples show a decided falling off of CO with a corresponding increase in nitrogen when the reaction approaches completion. The nitrogen gas is then shut off, the connections broken to the nitrogen supply and the retort sealed by closing the valves 8, 9, 10 and 4. The retort is then lifted from the furnace by a suitable hoist and another retort already charged set in the furnace and the operation repeated.

The hot retort is transferred to a cooling room and when it has cooled to room temperature, its contents are dumped after removing the flanged head 2; the flanged head is then again fastened to the retort and the latter recharged, for a second operation, through the opening made by removing the plug 6.

The product from the retort containing sodium cyanide is placed in air-tight cans until it can be extracted for the production of high grade sodium cyanide or hydrolyzed for the production of ammonia by the means usually employed for these purposes. To the resulting residue in either case is added the necessary make-up of sodium carbonate and carbon and after drying and thoroughly mixing the remade charge is again furnaced for the production of more cyanide. This operation may be repeated until such time as the impurities from the coke have built up to such an extent that they interfere with the proper operation of the process, when the soluble sodium salts, consisting of sodium carbonate, sodium hydroxide (from the oxide present) and sodium chloride, or fluoride, as the case may be, are dissolved from the insoluble carbon and iron residue, evaporated, dried and made up with a new lot of carbon. By selecting a form of carbon low in ash the furnacing operation may be repeated many times before an entire removal of carbon becomes necessary.

It will be understood that I may depart widely from the charges and proportions of the mixtures given above; that I may vary the proportion of chlorides or fluorides to the other alkali-metal compounds, and that said other alkali-metal compounds may be sulphates, hydroxides, and the like, instead of carbonates; that I may use varying proportions of a mixture of various alkali-metal halides, and varying proportions of oxides, sulphates, or other reducible compounds of iron, or metallic iron in a finely divided condition, or similar compounds of other metals, or the metals which have the property of taking up and transmitting carbon, or nitrogen, in the mixtures with alkali-metal compounds other than halides; and may make many changes in the methods of manipulation or of the apparatus without departing from the scope of the invention.

What I claim is:

1. The process of making an alkali-metal cyanide, which comprises heating in contact with nitrogen a mixture containing an alkali-metal halide, a reducible compound of a carbide-forming metal, a compound of an alkali-metal other than a halide, and carbon, to a temperature sufficient to effect a reaction between the carbon, nitrogen and the second alkali-metal compound to form an alkali-metal cyanide.

2. The process of making sodium cyanide, which comprises heating in contact with nitrogen a mixture containing a sodium halide, a reducible compound of a carbide-forming metal, sodium carbonate, and carbon, to a temperature suffiient to effect a reaction between the carbon, nitrogen and the sodium carbonate to form sodium cyanide.

3. The process of making sodium cyanide, which comprises heating in contact with nitrogen a mixture containing sodium fluoride, a reducible compound of a carbide-forming metal, sodium carbonate, and carbon, to a temperature sufficient to effect a reaction between the nitrogen, carbon and sodium carbonate to form sodium cyanide.

4. The process of making an alkali-metal cyanide, which comprises heating in contact with nitrogen a mixture containing an alkali-metal halide, a reducible compound of a carbide and nitride-forming metal, a compound of an alkali-metal other than a halide, and carbon, to a temperature sufficient to effect a reaction between the carbon, nitrogen and the second alkali-metal compound to form an alkali-metal cyanide.

5. The process of making sodium cyanide, which comprises heating in contact with nitrogen a mixture containing a sodium halide, a reducible compound of a carbide and nitride-forming metal, sodium carbonate, and carbon, to a temperature sufficient to effect a reaction between the carbon, nitrogen and the sodium carbonate to form sodium cyanide.

6. The process of making sodium cyanide, which comprises heating in contact with nitrogen a mixture containing sodium fluoride, a reducible compound of a metal of the character hereinbefore described, sodium carbonate, and carbon, to a temperature sufficient to effect a reaction between the nitrogen, carbon and sodium carbonate to form sodium cyanide.

7. The process of making an alkali-metal cyanide, which comprises heating in contact with nitrogen a mixture containing an alkali-metal halide, oxide of iron, a compound of an alkali-metal other than a halide, and carbon, to a temperature sufficient to effect a reaction between the carbon, nitrogen and the second alkali-metal compound to form an alkali-metal cyanide.

8. The process of making an alkali-metal cyanide, which comprises heating in contact with nitrogen a mixture containing an alkali-metal halide, a finely divided substance comprising iron, a compound of an alkali-metal other than a halide, and carbon, to a temperature sufficient to effect a reaction between the carbon, nitrogen and the second alkali-metal compound to form an alkali-metal cyanide.

9. The process of making an alkali-metal cyanide, which comprises heating in contact with nitrogen a mixture containing an alkali-metal fluoride, a reducible compound of a carbide-forming metal, a compound of an alkali-metal other than a halide, and carbon, to a temperature sufficient to effect a reaction between the carbon, nitrogen and the second alkali-metal compound to form an alkali-metal cyanide.

10. The process of making an alkali-metal cyanide, which comprises heating in contact with a nitrogen-bearing gas a mixture containing an alkali-metal halide, a reducible compound of a carbide-forming metal, a compound of an alkali-metal other than a halide, and carbon, to a temperature sufficient to effect a reaction between the carbon, nitrogen and the second alkali-metal compound to form an alkali-metal cyanide.

11. The process of making sodium cyanide, which comprises heating in contact with a nitrogen-bearing gas a mixture containing a sodium halide, a reducible compound of a carbide-forming metal, sodium carbonate, and carbon, to a temperature sufficient to effect a reaction between the carbon, nitrogen and the sodium carbonate to form sodium cyanide.

12. The process of making sodium cyanide, which comprises heating in contact with a nitrogen-bearing gas a mixture containing sodium fluoride, a reducible compound of a carbide-forming metal, sodium carbonate, and carbon, to a temperature sufficient to effect a reaction between the nitrogen, carbon and sodium carbonate to form sodium cyanide.

13. The process of making an alkali-metal cyanide, which comprises heating in contact with a nitrogen-bearing gas a mixture containing an alkali-metal halide, oxide of iron, a compound of an alkali-metal other than a halide, and carbon, to a temperature sufficient to effect a reaction between the carbon, nitrogen and the second alkali-metal compound to form an alkali-metal cyanide.

14. The process of making an alkali-metal cyanide, which comprises heating in contact with a nitrogen-bearing gas a mixture containing an alkali-metal halide, a finely divided substance comprising iron, a compound of an alkali-metal other than a halide, and carbon, to a temperature sufficient to effect a reaction between the carbon, nitrogen and the second alkali-metal compound to form an alkali-metal cyanide.

15. The process of making an alkali-metal cyanide, which comprises heating in contact with a nitrogen-bearing gas a mixture containing an alkali-metal fluoride, a reducible compound of a carbide-forming metal, a compound of an alkali-metal other than a halide, and carbon, to a temperature sufficient to effect a reaction between the carbon, nitrogen and the second alkali-metal compound to form an alkali-metal cyanide.

16. The process of making an alkali-metal cyanide, which comprises making a mixture containing an alkali-metal halide, a reducible compound of a carbide-forming metal, a compound of an alkali-metal other than a halide, and carbon, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of nitrogen, at a temperature sufficient to effect a reaction between the carbon, nitrogen and the second alkali-metal compound to form an alkali-metal cyanide.

17. The process of making sodium cyanide, which comprises making a mixture containing an alkali-metal halide, a reducible compound of a carbide-forming metal, sodium carbonate, and carbon, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of nitrogen at a temperature sufficient to effect a reaction between the carbon, nitrogen and the sodium carbonate, to form sodium cyanide.

18. The process of making sodium cyanide, which comprises making a mixture composed of sodium fluoride, a reducible compound of a carbide-forming metal, sodium carbonate, and carbon, heating the mixture in a closed retort provided with an exit for the escape of gaseous products to a sufficient temperature to expel gaseous reduction products from the reducible com- pound of the carbide-forming metal to render the mixture porous, and subjecting the porous mixture to the action of nitrogen, at a temperature sufficient to effect a reaction between the carbon, nitrogen, and the sodium carbonate, to form sodium cyanide.

19. The process of making an alkali-metal cyanide which comprises making a mixture of an alkali-metal halide, oxide of iron, a compound of an alkali-metal other than a halide, and carbon, heating the mixture in a closed retort provided with an exit for the escape of gaseous products to a sufficient temperature to expel gaseous reduction products from the oxide of iron to render the mixture porous, and subjecting the porous mixture to the action of nitrogen, at a temperature sufficient to effect a reaction between the carbon, nitrogen and the second alkali-metal compound to form an alkali-metal cyanide.

20. The process of making an alkali-metal cyanide, which comprises making a mixture containing an alkali-metal halide, a reducible compound of a carbide-forming metal, a compound of an alkali-metal other than a halide, and carbon, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of a nitrogen-bearing gas at a temperature sufficient to effect a reaction between the carbon, nitrogen and the second alkali-metal compound to form an alkali-metal cyanide.

21. The process of making sodium cyanide, which comprises making a mixture containing an alkali-metal halide, a reducible compound of a carbide-forming metal, sodium carbonate, and carbon, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of a nitrogen-bearing gas at a temperature sufficient to effect a reaction between the carbon, nitrogen and the sodium carbonate, to form sodium cyanide.

22. The process of making sodium cyanide, which comprises making a mixture composed of sodium fluoride, a reducible compound of a carbide-forming metal, sodium carbonate, and carbon, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of a nitrogen-bearing gas, at a temperature sufficient to effect a reaction between the carbon, nitrogen, and the sodium carbonate, to form sodium cyanide.

23. The process of making an alkali-metal cyanide, which comprises making a mixture of an alkali-metal halide, oxide of iron, a compound of an alkali-metal other than a halide, and carbon, heating the mixture in a closed retort provided with an exit for the escape of gaseous products to a sufficient temperature to expel gaseous reduction products from the oxide of iron to render the mixture porous, and subjecting the porous mixture to the action of a nitrogen-bearing gas, at a temperature sufficient to effect a reaction between the carbon, nitrogen and the second alkali-metal compound to form an alkali-metal cyanide.

24. The process of making an alkali-metal cyanide, which comprises making a mixture of an alkali-metal halide, a reducible compound of a carbide-forming metal, a compound of an alkali-metal other than a halide and carbon, heating the mixture in a closed retort provided with an exit for the escape of gaseous products to a temperature of from about 850 to 950° C., and subjecting the heated mixture to the action of nitrogen, substantially as described.

25. The process of making sodium cyanide which comprises making a mixture of an alkali-metal halide, a reducible compound of a carbide-forming metal, sodium carbonate, and carbon, heating the mixture in a closed retort provided with an exit for the escape of gaseous products to a temperature of from about 850 to 950° C., and subjecting the heated mixture to the action of nitrogen, substantially as described.

26. The process of making sodium cyanide, which comprises making a mixture of sodium fluoride, a reducible compound of a carbide-forming metal, sodium carbonate, and carbon, heating the mixture in a closed retort provided with an exit for the escape of gaseous products to a temperature of from about 850 to 950° C., and subjecting the heated mixture to the action of nitrogen, substantially as described.

27. The process of making an alkali-metal cyanide, which comprises making a mixture of an alkali-metal halide, a reducible compound of a metal of the character hereinbefore described, a compound of an alkali-metal other than a halide and carbon, heating the mixture in a closed retort provided with an exit for the escape of gaseous products to a temperature of from about 850 to 950° C., and subjecting the heated mixture to the action of nitrogen, substantially as described.

28. The process of making an alkali-metal cyanide, which comprises making a mixture of an alkali-metal halide, oxide of iron, a compound of an alkali-metal other than a halide, and carbon, heating the mixture in a closed retort provided with an exit for the escape of gaseous products to a temperature of from about 850 to 950° C., and subjecting the heated mixture to the action of nitrogen, substantially as described.

29. The process of making an alkali-metal cyanide, which comprises making a mixture of an alkali-metal halide, a compound of an alkali-metal other than a halide, and carbon, heating the mixture in the presence of finely divided iron in a closed retort to a temperature of from 850 to 950° C., and subjecting the heated mixture to the action of nitrogen, substantially as described.

30. The process of making an alkali-metal cyanide, which comprises heating in contact with nitrogen under an absolute pressure of about two atmospheres a mixture containing an alkali-metal halide, a reducible compound of a carbide-forming metal, a compound of an alkali-metal other than a halide, and carbon, to a temperature sufficient to effect a reaction between the carbon, nitrogen and the second alkali-metal compound to form an alkali-metal cyanide.

31. The process of making sodium cyanide, which comprises heating in contact with nitrogen under an absolute pressure of about two atmospheres a mixture containing a sodium halide, a reducible compound of a carbide-forming metal, sodium carbonate, and carbon, to a temperature sufficient to effect a reaction between the carbon, nitrogen and the sodium carbonate to form sodium cyanide.

32. The process of making sodium cyanide, which comprises heating in contact with nitrogen under an absolute pressure of about two atmospheres a mixture containing sodium fluoride, a reducible compound of a carbide-forming metal, sodium carbonate, and carbon, to a temperature sufficient to effect a reaction between the nitrogen, carbon and the sodium carbonate to form sodium cyanide.

33. The process of making an alkali-metal cyanide, which comprises heating in contact with nitrogen under an absolute pressure of about two atmospheres a mixture containing an alkali-metal halide, oxide of iron, a compound of an alkali-metal other than a halide, and carbon, to a temperature sufficient to effect a reaction between the carbon, nitrogen and the second alkali-metal compound to form an alkali-metal cyanide.

34. The process of making an alkali-metal cyanide, which comprises passing nitrogen gas under an absolute pressure of from about 23 to 35 pounds per square inch in contact with a mixture containing an alkali-metal halide, a reducible compound of a carbide-forming metal, a compound of an alkali-metal other than a halide, and carbon, while maintaining said mixture at a temperature sufficient to effect a reaction between the carbon, nitrogen and second alkali-metal compound to form an alkali-metal cyanide.

35. The process of making an alkali-metal cyanide, which comprises passing nitrogen gas under an absolute pressure of from 23 to 35 pounds per square inch in contact with a mixture containing an alkali-metal halide, a finely divided substance comprising iron, an alkali-metal carbonate, and carbon, while maintaining said mixture at a temperature sufficient to effect a reaction between the carbon, nitrogen and alkali-metal carbonate to form an alkali-metal cyanide.

36. The process of making an alkali-metal cyanide, which comprises heating in a retort in contact with nitrogen a mixture containing an alkali-metal halide, a reducible compound of a carbide-forming metal, a compound of an alkali-metal other than a halide, and carbon, to a temperature sufficient to effect a reaction between the carbon, nitrogen and the second alkali-metal compound to form an alkali-metal cyanide, and maintaining the nitrogen at a pressure a little below the minimum pressure capable of causing injurious distortion of the retort at the temperature at which it is maintained during the reaction.

37. The process of making an alkali-metal cyanide, which comprises heating in a retort in contact with nitrogen a mixture containing an alkali-metal halide, a finely divided substance comprising iron, a compound of an alkali-metal other than a halide, and carbon, to a temperature sufficient to effect a reaction between the carbon, nitrogen and the second alkali-metal compound to form an alkali-metal cyanide, and maintaining the nitrogen at a pressure a little below the minimum pressure capable of causing injurious distortion of the retort at the temperature at which it is maintained during the reaction.

38. The process of making an alkali-metal cyanide which comprises heating in contact with nitrogen a mixture containing from 3 to 12 parts of an alkali-metal halide, from 35 to 15 parts of iron oxide, about 40 parts of an alkali-metal compound other than a halide and from 35 to 45 parts of carbon, to a temperature sufficient to effect a reaction between the carbon, nitrogen and the second alkali-metal compound to form an alkali-metal cyanide.

39. The process of making sodium cyanide, which comprises heating in contact with nitrogen a mixture containing from 3 to 12 parts of sodium fluoride, from 35 to 15 parts of iron oxide, about 40 parts of sodium carbonate and from 35 to 45 parts of carbon, to a temperature sufficient to effect a reaction between the carbon, nitrogen and the sodium carbonate to form sodium cyanide.

40. The process of making an alkali-metal cyanide, which comprises heating in contact with nitrogen a mixture containing from 3 to 12 parts of an alkali-metal halide, from 35 to 15 parts of a finely divided substance comprising iron, about 40 parts of an alkali-metal carbonate, and from 35 to 45 parts of carbon, to a temperature sufficient to effect a reaction between the carbon, nitrogen and the alkali-metal carbonate to form an alkali-metal cyanide.

41. The process of making an alkali-metal cyanide, which comprises heating in contact with nitrogen a mixture containing from 5 to 7 parts of an alkali-metal halide, about 15 parts of a finely divided substance comprising iron, about 40 parts of an alkali-metal carbonate, and about 40 parts of carbon, to a temperature sufficient to effect a reaction between carbon, nitrogen and the alkali-metal carbonate to form an alkali-metal cyanide.

42. The process of making an alkali-metal cyanide, which comprises heating in contact with nitrogen a mixture containing from 3 to 7 parts of an alkali-metal fluoride, about 15 parts of iron oxide, about 40 parts of an alkali-metal carbonate, and about 40 parts of carbon, to a temperature sufficient to effect a reaction between carbon, nitrogen and the alkali-metal carbonate to form an alkali-metal cyanide.

43. The process of making sodium cyanide which comprises heating in contact with nitrogen a mixture containing about 5 parts of sodium fluoride, about 15 parts of iron oxide, about 40 parts of sodium carbonate, and about 40 parts of carbon, to a temperature sufficient to effect a reaction beween carbon, nitrogen and sodium carbonate to form sodium cyanide.

44. The process of making sodium cyanide which comprises heating in contact with nitrogen a mixture containing about 5 parts of sodium fluoride, about 15 parts of iron oxide, about 40 parts of sodium carbonate, and about 40 parts of carbon, to a temperature of 925 to 950° C., while maintaining the nitrogen at an absolute pressure of about two atmospheres.

In testimony that I claim the foregoing, I have hereunto set my hand this 26 day of February, 1919.

CHARLES B. JACOBS.